A. KINGSBURY AND H. A. S. HOWARTH.
BEARING.
APPLICATION FILED MAY 5, 1916.
1,387,929.
Patented Aug. 16, 1921.
2 SHEETS—SHEET 1.
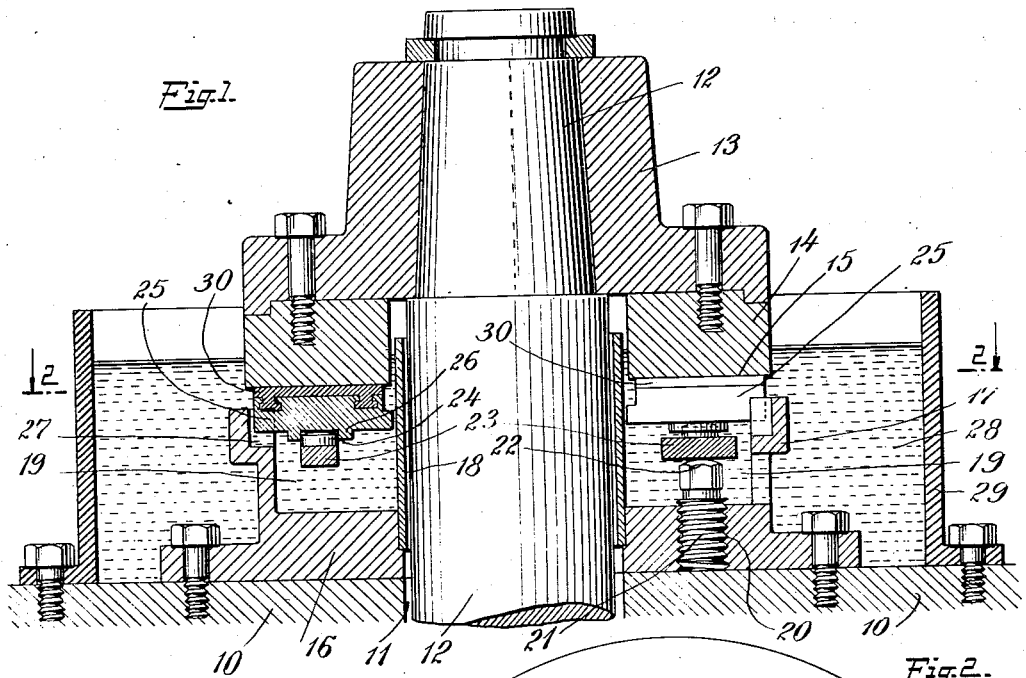
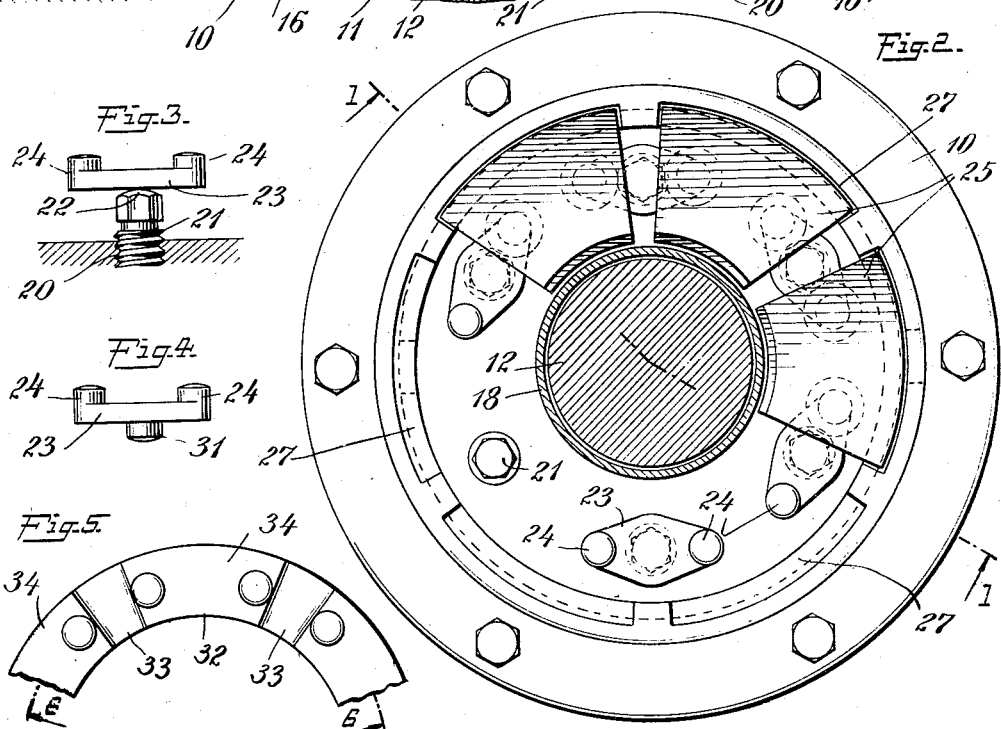
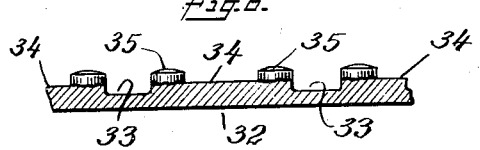
Inventors
Albert Kingsbury &
Harry A. S. Howarth
By their Attorney A. KINGSBURY AND H. A. S. HOWARTH.
BEARING.
APPLICATION FILED MAY 5, 1916.
1,387,929.
Patented Aug. 16, 1921.
2 SHEETS—SHEET 2.
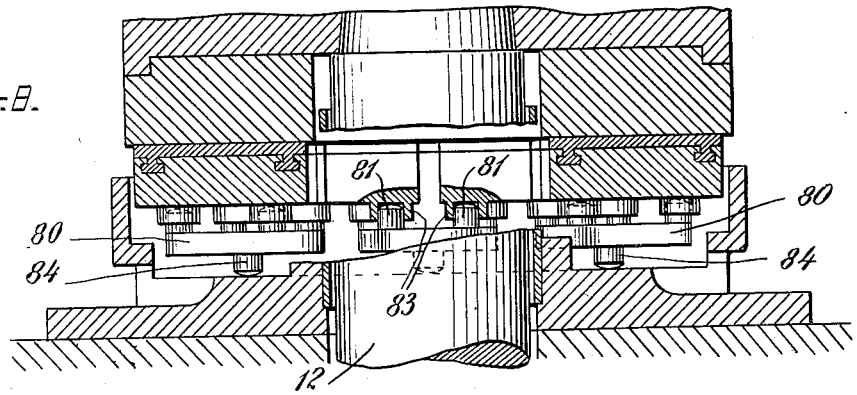
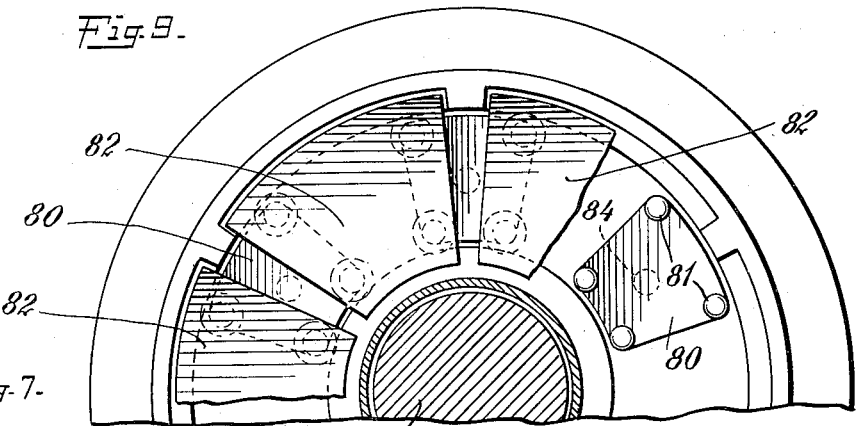
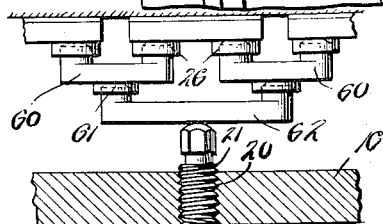

UNITED STATES PATENT OFFICE.

ALBERT KINGSBURY AND HARRY A. S. HOWARTH, OF PITTSBURGH, PENNSYLVANIA; SAID HOWARTH ASSIGNOR TO SAID KINGSBURY.

BEARING.

1,387,929.  Specification of Letters Patent.  Patented Aug. 16, 1921.

Application filed May 5, 1916. Serial No. 95,557.

*To all whom it may concern:*

Be it known that we, ALBERT KINGSBURY and HARRY A. S. HOWARTH, citizens of the United States, and residents of Pittsburgh, Allegheny county, and State of Pennsylvania, have invented certain new and useful Improvements in Bearings, of which the following is a specification, reference being had to the accompanying drawings, forming a part thereof.

Our invention relates to bearings and particularly to thrust bearings which comprise a plurality of tiltably or flexibly mounted bearing segments or shoes adapted to be automatically lubricated in accordance with the principles of operation set forth in patents previously granted to Albert Kingsbury, as for example see Patents Nos. 947,242 granted January 25, 1910, and 1,117,499 granted November 17, 1914.

One object of our invention is to provide a bearing of the aforesaid character having a simple and effective means for supporting the bearing members and equitably distributing or equalizing the thrust pressure upon them.

Another object is to provide an annular bearing and equalizing structure comprising a circumferentially arranged series of bearing segments or shoes and a system of relatively rigid tiltable equalizing supports associated therewith in such connected relation that the said segments and supports, considered as a whole, constitute a substantially continuous but longitudinally flexible ring member.

Another object is to provide a series of equalizing supports that are flexibly connected at their ends by the bearing members or segments or shoes, which are pivotally mounted thereon in such manner that each shoe or segment is particularly free to assume a tilted position in operation, irrespective of the direction of relative rotation of the segments and coöperating thrust member.

Another object is to provide a bearing comprising a plurality of segments or shoes and a flexibly connected unitary system of equalizer members or sections that are adapted to support each segment at two circumferentially separated points on the said system.

Another object is to provide a bearing comprising a plurality of bearing segments and an equalizing system therefor on which each of said segments is mounted at two circumferentially-spaced points, said segments and equalizing system being so interrelated as to provide a substantially-continuous longitudinally-flexible unit.

Other objects and advantages of our invention will be set forth hereinafter, and in order that our invention may be thoroughly understood, we will now proceed to describe the same in the following specification, and then point out the novel features thereof in appended claims.

The invention is capable of receiving a variety of mechanical expressions, some of which are shown on the accompanying drawings, but it is to be expressly understood that the drawings are for purposes of illustration only and are not to be construed as a definition of the limits of the invention, reference being had to the appended claims for that purpose.

Referring to the drawings:

Figure 1 is a sectional elevation, taken on the line 1—1 of Fig. 2, of a thrust bearing which constitutes an embodiment of our invention.

A partially sectional plan view of the same bearing is shown in Fig. 2. This view is taken on the line 2—2 of Fig. 1 and certain of the shoes are removed to disclose the supporting equalizer system.

Fig. 3 is an elevation showing one of the equalizing supports in detail.

A slightly modified form of equalizing support is shown in Fig. 4 which corresponds to Fig. 3.

Fig. 5 is a partial plan view, and

Fig. 6 is a sectional elevation of an integral ring structure which may be substituted for the several equalizing members of the previous figures and which constitutes another embodiment of our invention.

Still another embodiment of our invention is shown in Fig. 7.

Figs. 8 and 9 are respectively a sectional elevation and a partial plan view of a structure which is another embodiment of our invention.

Corresponding parts are designated by the same reference characters in all the figures.

In the form shown in Figs. 1, 2 and 3, 10 represents a stationary frame or foundation having a hole or opening 11, through which a shaft 12 extends. Secured to the shaft is a thrust block 13, to which is bolted a thrust collar 14 having a bearing surface 15. A base 16 is bolted or otherwise suitably secured to the frame 10 and is annular in form so that the shaft extends through it. The base has a flange 17 near its outer edge and has affixed to its inner edge a sleeve 18 which surrounds the shaft.

In the bottom of the channel 19 which is formed by the parts 17 and 18, are a plurality of tapped holes 20 into which screws or studs 21 extend. These screws or studs constitute adjustable supports and have spherically curved tops 22 upon which equalizing blocks 23 are mounted. In the form shown in Figs. 2 and 3 each of the equalizing blocks has upwardly extending projections 24 at its respective ends which are provided with rounded tops and constitute pivotal supports for the bearing segments or shoes 25. Each bearing shoe is shown as having a pair of recessed lugs 26 into which the adjacent end projections 24 of a pair of equalizing blocks 23 extend, and the arrangement of parts is such that each shoe bridges the adjacent ends of a pair of equalizing supports or members 23 and is flexibly joined thereto by ball and socket joints. The result is a flexible annular structure composed of shoes that are capable of tilting both tangentially and radially and a series of interconnected equalizer members that are adapted to equitably distribute the pressure on the bearing surfaces of the several shoes.

The outer edges of the shoes fit loosely into recesses 27 in the flange 17 while the inner edges are close to sleeve 18 and the shoes are thus prevented from either rotating on their pivots or revolving about the shaft, while they are left free to assume a tilted position in response to the wedging action of the lubricating fluid in which the bearing surfaces are immersed and also to tilt radially to compensate for crowning or for other irregularities in the bearing surface of the thrust collar with which they coöperate.

The preferred level of the lubricating fluid is indicated in Fig. 1, the fluid being contained in the annular receptacle 28 provided between the sleeve 18 and an outer wall or flange 29 which is bolted or otherwise secured to the frame 10.

The shoes are preferably faced with soft metal as indicated at 30, and coöperate with the bearing surface 15 of the thrust collar.

Attention is directed to the fact that each shoe is practically provided with two pivotal points, but since these points are on independent or flexibly connected members which are tiltably mounted, the shoes are particularly free to tilt in either direction.

Each shoe instead of having only two points of support may be supported at four points as hereinafter explained in connection with Figs. 8 and 9.

While it is desirable to be able to adjust the supports for the equalizer blocks as, for example, by setting the screws or studs 21, this is not essential to our invention and each of the equalizing blocks may be formed, as shown in Fig. 4, with a downwardly-extending spherically-faced lug or projection 31 which may either rest on the base 16 or upon any suitable equalizing carrier, such, for example, as one of those shown in the Kingsbury Patent No. 1,117,499.

In Figs. 5 and 6, we have shown an embodiment of our invention in which the several equalizing supports or members are joined to form an integral ring structure 32 having flexible webs 33 between the rigid sections 34 which correspond to the blocks 23, said rigid sections 34 having upwardly extending projections 35 (corresponding to the projections 24) at their respective ends.

The arrangement shown in Fig. 7 is a slight modification of the arrangement shown in Figs. 1, 2 and 3, in that the equalizing blocks 60 which correspond to the blocks 23 are provided on their bottom surfaces with recessed lugs 61 similar to the lugs 26 on the shoes 25. They are supported in pairs upon equalizing blocks 62 which resemble the blocks 23 in structure and mounting.

Thus a greater freedom of movement is provided and a fewer number of supports are required. This arrangement also constitutes an elastic-unitary ring structure, the parts of which are flexibly interconnected by the ball and socket joints between the shoes and blocks.

In the form shown in Figs. 8 and 9, equalizers 80, having four upwardly extending projections 81 instead of two only, may be substituted for the equalizing blocks 23, each of the shoes 82 being provided with suitably located recessed lugs 83 to coöperate with the projections on the equalizing supports or members 80. Each of the shoes is therefore mounted upon a pair of equalizer blocks as clearly shown in Fig. 9, and has four points of support.

Each of the equalizers is tiltably mounted, being provided in the arrangement shown with downwardly extending projections 84. The equalizers may, of course, be tiltably mounted in any suitable manner; for example, the arrangement of Fig. 3 may be utilized instead of the arrangement shown which corresponds to Fig. 4. Attention is directed to the fact that in all the constructions above described the equalizing supports are flexibly interconnected at their ends by the ball and socket joints between them and the bearing shoes; so that the equalizing members and the shoes, considered as a whole, constitute in every case a substantially continuous, or unitary, and longitudinally flexible ring member. In some embodiments the ends of the equalizer members are also joined by supplemental flexible webs. But in all cases the mounting of each bearing shoe at two circumferentially separated points on the annular equalizing support serves to bridge over the gap or the flexible web between the ends of adjacent equalizer blocks, and thereby secures two results; viz. a flexible interconnection of adjacent ends of the bearing shoes and the coincident flexible interconnection of contiguous ends of the equalizer blocks. This characteristic conjunction of the relatively rigid portions of the equalizer and of the superimposed shoes exists irrespective of whether the equalizer is in the form of structurally separate or integrally connected members; and irrespective of whether there is a single or double ball and socket connection between the shoes and the equalizer sections. The bearing shoes are, in all cases, capable of free radial, as well as circumferential, tilting movement; and this movement combined with that afforded by the universal-joint connections between the shoes and the successive equalizer sections affords an effective means for the automatic distribution of thrust pressure over the entire annular area of engagement between the bearing surfaces.

The blocks 23, shown in Fig. 3, and the blocks 62, shown in Fig. 7, are mounted on adjustable screw supports which constitute non-automatic leveling members that can be used in correcting or compensating for large inaccuracies or irregularities in machining or in the subsequent wear of the parts. When these irregularities are small these adjustable supports may be omitted entirely, or may, if desired, be replaced by automatic leveling means, such, for example, as are shown and described in the earlier Kingsbury Patent 1,117,499 previously mentioned.

It is evident that our invention may be embodied in various modifications of the structures shown and described. While the spherically-faced projections 24, 35 and 81 have been shown as a part of the equalizer blocks it is apparent that the arrangement could be reversed and said projections be provided on the bearing segments or shoes without departing from the spirit of our invention. The use of sockets to receive said projections is also not essential and therefore the term "connect," and similar terms, applied to the interrelation of the bearing segments and pressure-distributing members, is to be construed broadly to include any suitable construction or arrangement whereby said elements are associated to form a substantially-continuous, longitudinally-flexible system. Accordingly, we intend that only such limitations be imposed as are indicated in the appended claims.

What we claim is:

1. A thrust bearing comprising a base, a plurality of equalizing supports tiltably mounted thereon, and bearing shoes mounted on the equalizing supports and flexibly connecting the same.

2. A thrust bearing comprising a base, a plurality of equalizing supports pivotally supported thereon, and bearing shoes flexibly supported on and connecting the equalizing supports.

3. A thrust bearing comprising a base, a series of equalizing supports titably supported thereon and provided with upwardly extending projections, and bearing shoes seated on the said projections and flexibly connecting the equalizing supports at their adjacent ends.

4. A thrust bearing comprising a base, a plurality of equalizing blocks tiltingly mounted thereon and provided with upwardly extending projections, and bearing shoes provided with downwardly extending recessed lugs adapted to pivotally engage the said projections and flexibly connecting adjacent blocks.

5. A thrust bearing comprising a base, a plurality of bearing shoes, and annularly arranged tiltably supported means for tiltably supporting each shoe at its ends and for flexibly connecting adjacent ends of successive shoes.

6. A thrust bearing comprising a base, a plurality of bearing shoes, an annularly arranged equalizing means for bridging and flexibly uniting adjacent ends of the bearing shoes, and means for pivotally supporting the said equalizing means and thereby permitting the bearing shoes to rock circumferentially.

7. A thrust bearing comprising a base, a series of equalizing supports carried thereon, and a plurality of bearing shoes pivotally connected at two points to the equalizing supports.

8. In a thrust bearing the combination of a rotating bearing member, a stationary base, a series of equalizing supports carried on the base, and a plurality of annularly arranged bearing shoes pivotally connected at two points to the equalizing supports and capable of tilting thereon in radial directions.

9. In a thrust bearing the combination of a series of bearing shoes, a base, and an annularly arranged series of tiltable equalizer members interposed between the base and the shoes and serving both to flexibly connect adjacent ends of said shoes and also to permit them to tilt independently of each other in radial directions.

10. In a thrust bearing, the combination of a base, a plurality of bearing shoes, and an interposed equalizing system of tiltable members on which the shoes are mounted for radial tilting and by which the adjacent ends of contiguous shoes are flexibly connected.

11. A thrust bearing comprising a base, a plurality of equalizing blocks tiltably mounted thereon, and bearing shoes tiltably mounted on said equalizing blocks, each of said shoes bridging the adjacent ends of, and being supported by, a pair of equalizing blocks.

12. A thrust bearing comprising a base, a plurality of adjustable supports extending upwardly therefrom, equalizing blocks tiltably mounted thereon, and bearing shoes tiltably supported on the equalizing blocks, each of said shoes bridging the adjacent ends of, and being supported by, a pair of equalizing blocks.

13. A thrust bearing comprising a base, a plurality of adjustable supports extending upwardly therefrom, equalizing blocks tiltably mounted thereon and having upwardly extending end projections, and bearing shoes pivotally mounted on said projections, each shoe bridging the adjacent ends of, and being supported by, a pair of equalizing blocks.

14. A thrust bearing comprising a base, a plurality of adjustable supports extending upwardly therefrom, equalizing blocks tiltably mounted on the supports and having upwardly extending end projections, and bearing shoes each having downwardly extending recessed lugs near its respective ends which engage with the upwardly extending projections of adjacent blocks.

15. A bearing comprising a plurality of circumferentially arranged spaced supports, an annular series of tiltable members mounted on said supports, and a plurality of bearing shoes, each of which is tiltably mounted on two of said members at circumferentially-separated points.

16. A thrust bearing comprising a base, a series of circumferentially spaced bearing shoes, and interposed equalizing members tiltably supported on the base between the shoes and pivotally connected at each end to the said shoes to form a flexibly continuous structure.

17. A thrust bearing comprising a base, a series of circumferentially spaced bearing shoes, adjustable pivots on the base between the shoes, and interposed equalizing members tiltably mounted on said pivots and arranged to connect the adjacent ends of successive shoes and to form therewith a substantially continuous unitary ring member.

18. A thrust bearing comprising a base, a series of circumferentially spaced bearing shoes, interposed equalizing members tiltably supported on the base between the shoes and pivotally connected thereto to form a unitary flexible ring member, and means for adjusting the relative position of the equalizing members and the base.

19. A thrust bearing comprising a base, a plurality of equalizing supports tiltably mounted thereon, bearing shoes mounted on the equalizing supports and flexibly connecting the same, and means for adjusting the relative positions of the equalizing supports and the base.

20. A thrust bearing comprising a base, a series of equalizing sections tiltably supported thereon and provided with upwardly extending projections, bearing shoes seated on the said projections and flexibly connecting the equalizing sections at their adjacent ends, and means for adjusting the supports for the equalizing sections and the shoes carried thereon.

21. A thrust bearing comprising a base, a plurality of equalizing blocks tiltably supported thereon, bearing shoes flexibly connected at each end to the adjacent ends of the equalizing blocks, and means for adjusting the supports for the equalizing blocks and the shoes connected thereto.

22. In a thrust bearing, the combination of an annularly arranged system of equalizer sections, and a superimposed series of bearing segments pivotally connected thereto and forming in conjunction therewith a substantially unitary flexible structure.

23. A bearing comprising a base, a series of equalizing supports tiltably mounted thereon, and a plurality of bearing segments tiltably mounted on said equalizing supports, each of said segments having two points of engagement with said equalizing supports.

24. In a bearing, the combination of an annularly-arranged system of equalizer sections, and an annularly-arranged series of bearing segments pivotally connected to adjacent ends of contiguous equalizer sections and forming therewith a flexibly continuous unitary structure.

25. A bearing comprising a base, a plurality of equalizing supports tiltably mounted thereon, and bearing segments tiltably mounted on and flexibly connecting said equalizing supports.

26. A bearing comprising a base, a plurality of bearing segments, and annularly arranged flexibly-mounted equalizing means for bridging and flexibly uniting adjacent ends of the bearing segments.

27. A bearing comprising a base, a plurality of bearing segments, and interposed equalizing members tiltably mounted on the base and pivotally connecting adjacent ends of said segments to form a flexibly continuous structure.

28. A bearing comprising a continuous pivotally-connected series of alternating bearing segments and equalizing supports.

29. A bearing comprising a series of alternating bearing segments and equalizing supports interconnected to constitute a flexible substantially continuous structure.

30. A bearing comprising a continuous series of alternating bearing segments and tiltably mounted equalizing supports.

31. A bearing comprising a series of bearing segments and tiltably-mounted equalizer supports, each of said supports engaging two contiguous segments and each of said segments engaging two contiguous supports.

32. A bearing comprising a series of bearing segments and tiltably-mounted equalizer supports, each of said supports engaging two contiguous segments adjacent the ends of the same and each of said segments engaging two contiguous supports adjacent the ends of the same.

33. In a bearing, a base, a plurality of bearing segments and a plurality of equalizing members supporting said segments for radial tilting, each of said segments having two points of engagement with said equalizing members and said equalizing members being tiltably-mounted on said base to enable said segments to tilt circumferentially.

34. A bearing comprising a continuous pivotally-connected series of bearing segments and tiltable equalizing sections that bridge the adjacent ends of said segments.

35. A bearing comprising a plurality of bearing segments, and a plurality of equalizing members pivotally connected to each end of each segment.

36. A bearing comprising a base, a plurality of bearing segments, and a plurality of equalizing members tiltably mounted on said base intermediate successive segments, said equalizing members engaging each end of each segment.

37. A bearing comprising a plurality of bearing segments, and a plurality of tiltably-mounted equalizing members tiltably-supporting each end of each segment.

38. A bearing comprising a support, a series of bearing segments, and an interposed series of equalizing members flexibly connecting the adjacent ends of said segments, each of said equalizing members being mounted on said base to tilt universally.

39. A bearing comprising a support, a series of bearing segments, and an interposed series of equalizing members flexibly connecting the adjacent ends of said segments, each of said equalizing members being mounted on said base to tilt universally and each of said segments being mounted on said equalizing members to tilt radially independently thereof.

40. A bearing comprising a continuous pivotally-connected series of bearing segments and tiltable equalizing sections, each of said segments being mounted on said equalizing sections at two circumferentially-separated points.

41. A bearing comprising a continuous pivotally-connected series of bearing segments and tiltable equalizing sections, each of said segments being mounted on two of said equalizing sections.

42. A bearing comprising a continuous pivotally-connected series of bearing segments and tiltable equalizing sections, each of said segments bridging the adjacent ends of two of said equalizing sections.

In witness whereof, we have hereunto set our hands this 2nd day of May, 1916.

ALBERT KINGSBURY.
HARRY A. S. HOWARTH.

Witnesses:
 EMMA LEA MONTGOMERY,
 T. GRAVES.